(12) United States Patent
Dai

(10) Patent No.: US 8,403,505 B2  
(45) Date of Patent: Mar. 26, 2013

(54) PROJECTOR FOR ADJUSTING PROJECTION DIRECTION

(75) Inventor: Lung Dai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 275 days.

(21) Appl. No.: 12/868,157

(22) Filed: Aug. 25, 2010

(65) Prior Publication Data

US 2011/0267588 A1 Nov. 3, 2011

(30) Foreign Application Priority Data

Apr. 30, 2010 (TW) .................................. 99113773

(51) Int. Cl.  
*G03B 21/14* (2006.01)

(52) U.S. Cl. .............. 353/119; 353/31; 353/37; 353/38; 353/72; 353/79; 353/98; 353/122; 348/787; 348/789

(58) Field of Classification Search .................... 353/20, 353/30, 31, 37, 38, 71, 72, 74, 79, 98, 119, 353/122; 349/5, 7, 8, 9, 13; 348/425.2, 787, 348/788, 789  
See application file for complete search history.

(56) References Cited

U.S. PATENT DOCUMENTS

| | | | |
|---|---|---|---|
| 6,343,862 B1 * | 2/2002 | Sawai et al. | 353/1 |
| 6,805,451 B1 * | 10/2004 | Tzong et al. | 353/119 |
| 8,123,361 B2 * | 2/2012 | Nagashima et al. | 353/30 |
| 8,231,232 B2 * | 7/2012 | Kanbara et al. | 353/119 |
| 2002/0113912 A1 * | 8/2002 | Wright et al. | 349/13 |
| 2009/0040397 A1 * | 2/2009 | Chan et al. | 348/751 |
| 2009/0051829 A1 * | 2/2009 | Nagahata et al. | 348/789 |
| 2009/0290129 A1 * | 11/2009 | Yoshida | 353/31 |
| 2010/0231868 A1 * | 9/2010 | Chen et al. | 353/82 |

* cited by examiner

*Primary Examiner* — Georgia Y Epps  
*Assistant Examiner* — Sultan Chowdhury  
(74) *Attorney, Agent, or Firm* — Altis Law Group, Inc.

(57) ABSTRACT

A projector includes a main body and an optical assembly. The main body forms an image and projects the image to a first screen through a lens of the main body. The optical assembly is detachable from the light path of the lens, and is used for reflecting light beams emitted from the lens to project an image on a second screen when the optical assembly is in the light path of the lens. When the optical assembly is detached from the light path of the lens, the optical assembly projects the image on the first screen. The first screen and the second screen are on two adjacent perpendicular surfaces, such as a wall and a ceiling.

20 Claims, 2 Drawing Sheets

PROJECTOR FOR ADJUSTING PROJECTION DIRECTION

BACKGROUND

1. Technical Field

The present disclosure relates to projectors.

2. Description of Related Art

Projectors are devices that project images onto surfaces where they can be viewed. Conventional projectors usually project an image in a direction along an optical axis of the projector which intersects with a screen. Users view the images along the optical axis of the projector. While some users would like to lie down to enjoy viewing images projected by the projector when at home. Laying down the users may have to raise their heads to view the images. However, it is not easy for the users to keep their heads raised for long periods of time.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of a projector. Moreover, in the drawings, like reference numerals designate corresponding parts throughout the views.

DETAILED DESCRIPTION

Embodiments of the present disclosure will now be described in detail with reference to the drawings.

Figure 1:
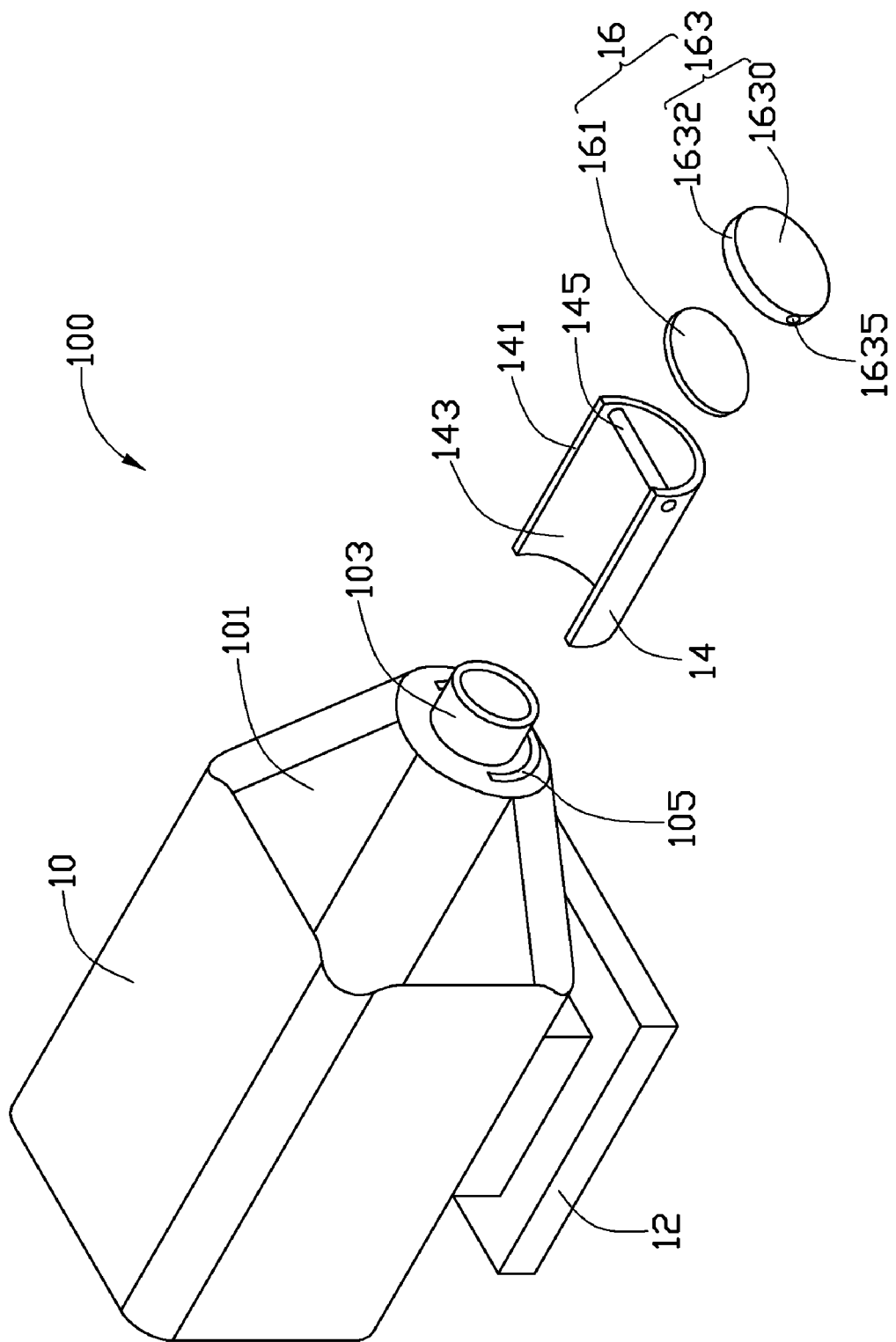
FIG. 1 is an exploded view of a projector according to an exemplary embodiment.
Figure 2:
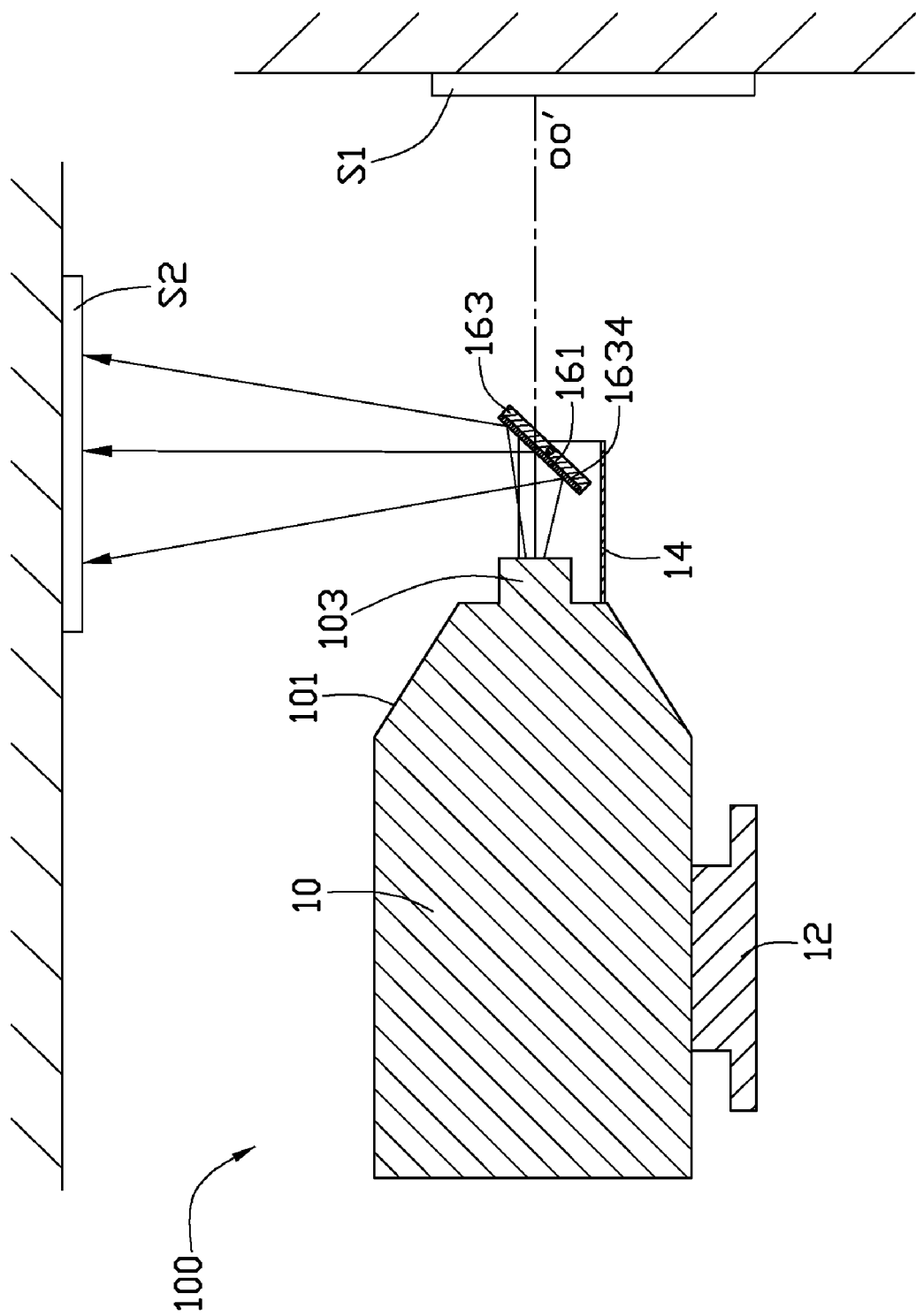
FIG. 2 shows the application of the projector of FIG. 1.

Referring to FIGS. 1 and 2, a projector 100 according to an exemplary embodiment is illustrated. The projector 100 includes a main body 10 having optical system (not shown) for forming an image, a stand 12, a moveable member 14, and an optical assembly 16.

The stand 12 usually stands on a support place such as a table (not shown). The stand 12 is used for supporting the main body 10. In other embodiments, the stand 12 can be removed.

The main body 10 is installed on the stand 12. As the main body 10 is held up by the stand 12, the main body 10 may be spaced from the table to facilitate heat dissipation for the main body 10. The main body 10 is substantially rectangular and includes a front portion 101 and a lens 103. The lens 103 is disposed in the front portion 101 for projecting an image formed by the optical system disposed inside the main body 10. The lens 103 includes an optical axis OO'. Light beams from the optical system inside the main body 10 can be projected out of the front portion 101 through the lens 103, and form a projected image on a first screen 51 which is substantially perpendicular with the optical axis OO'. The front portion 101 defines a C-shaped recess 105 beneath the lens and extending along the optical axis OO'.

The movable member 14 is movably mounted on the main body 10 and is distally slidable relative to the main body 10 between a retracted and an extended position. One end of the moveable member 14 is movably received in the recess 105, the other end of the member 14 extends out of the recess 105 to form a connecting end 141. The moveable member 14 defines an opening 143. The opening 143 runs through the moveable member 14 and extends along the optical axis OO'. The opening 143 allows the light beams emitted from the optical system inside the main body 10 to pass without any impediment. In this embodiment, the cross view of the moveable member 14 is substantially semi-circular. As the light beams are divergent, the length of the connecting end 141 which takes along the optical axis OO' should not be too long. Thus, the light beams can pass through the opening 143 without being impeded. The length of the connecting end 141 can be adjusted by changing receiving degree of the moveable member 14 in the recess 105. The moveable member 14 includes a pillar 145. The pillar 145 is received in the opening 143, and two ends of the pillar 145 are fixed on the connecting end 141.

The optical assembly 16 is rotatably received in the opening 143. The optical assembly 16 includes an optical member 161 and a carrier 163 for carrying the optical member 161. The optical member 161 includes a bottom wall 1630 and a side wall 1632. The side wall 1632 connects with the bottom wall 1630 to define a compartment 1634. The compartment 1634 is used for receiving the optical member 161. The side wall 1632 defines a through hole 1635 which is communicating with the compartment 1634. The through hole 1635 is used for receiving the pillar 145. When the pillar 145 is received in the through hole 1635, the carrier 163 is rotatably installed on the connecting end 141.

The optical member 161 is set on optical path of the light beams by adjusting the carrier 163 relative to the connecting end 141. In this embodiment, the optical member 161 is a mirror. The optical member 161 is used for reflecting the light beams which are projecting out of the front portion 101, and form projection image on a second screen S2 accordingly. The second screen S2 is substantially parallel to the optical axis OO'. Thus, the first screen S1 is substantially perpendicular with the second screen S2.

When the optical assembly 16 is ready for being installed on the moveable member 14, the optical assembly 16 is received in the opening 143 of the moveable member 14 then the pillar 145 is fixed on the connecting end 141 after passing through the connecting end 141 and the side wall 1632 of the carrier 163. Thus, the optical member 161 is rotatably connected to connecting end 141 of the moveable member 14. To rotate the carrier 163, the optical member 161 can be on the light path of the lens 103. Thus, the optical member 161 can receive the light beams from the front portion 101, and reflect the light beams to the second screen S2. The decline between the optical member 161 and the lens 103 can easily be adjusted by rotating the carrier 163.

When a user want to use the projector 100 to project an image on the first screen S1, the moveable member 14 can be disassembled from the recess 105. Thus, the optical assembly 16 will not affect the projection on the first screen S1, and it is easy for users to operate the projector 100 to project view either on the first screen S1 or on the second screen S2. When the projector 100 projects the image on the second screen S2, it may be more comfortable for the users lying down to view the visual.

In this embodiment, the moveable member 14 can be pushed against the recess 105, so that the carrier 163 is able to cover the lens 103 for protecting the lens 103 when the projector 100 is turned off.

In other embodiments, the moveable member 14 can be other structures as long as the optical assembly 16 is withdrawn from the light path of the lens 103 when the projector 100 projects an image on the first screen S1. For example, the connecting end 141 is rotatable connected to the moveable member 14, thus, the connecting end 141 can be turned down from the moveable member 14, and the optical assembly 16 is withdrawn from the light path of the lens 103. Another example, the moveable member 14 is a stand which is independent from the main body 10. The moveable member 14 can be set in the light path of the lens 103 when the projector 100 projects view on the second screen S2, and further can be moved away from the light path of the lens 103 when the projector 100 projects view on the first screen S1.

In this embodiment, the recess 105 is substantially arced. In other embodiments, the recess 105 can be substantially annular. Thus, the moveable member 14 can further be rotated along the annular recess 105, and the optical assembly 16 can be rotated accordingly. The projector 100 can project an image on a right side screen, a left side screen, or a bottom screen. The directional adjustment of the projector 100 is improved.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. A projector, comprising:
   a main body for forming an image and projecting the image to a first screen via a lens of the main body;
   an optical assembly operable to be detachable from a light path of the lens, the optical assembly configured for reflecting light beams emitted from the lens to project an image on a second screen when the optical assembly is in the light path of the lens, when the optical assembly is detached from the light path of the lens, the optical assembly projects the image on the first screen, the first screen intersecting with the second screen; and
   a moveable member rotatably connected to the main body, one end of the moveable member is moveable received in the main body, the other end of the moveable member extends out of the main body to form a connecting part, the optical assembly being set on the connecting part.

2. The projector of claim 1, wherein the first screen is substantially perpendicular with an optical axis of the lens; the second screen is substantially parallel to the optical axis of the lens.

3. The projector of claim 1, wherein the main body defines a recess, the received end of the moveable member is received in the recess, length of the connecting part is operable to be adjusted by changing depth of the received end in the recess.

4. The projector of claim 3, wherein the received end of the moveable member is detachably received in the recess.

5. The projector of claim 1, wherein the moveable member defines an opening, the opening runs through the moveable member and is along the optical axis, the optical assembly receives the light beams from the lens after passing through the opening.

6. The projector of claim 5, wherein the optical assembly comprises an optical member and a carrier for carrying the optical member, the carrier is rotatably connected to the connecting part, the optical member is configured for reflecting the light beams to project an image on the second screen.

7. The projector of claim 6, wherein the optical member is a mirror.

8. The projector of claim 6, wherein the moveable member is operable to be pushed against the recess to drive the carrier to cover the lens for protecting the lens.

9. The projector of claim 6, wherein the recess is substantially annular, the moveable member is operable to be rotated along the annular recess, and the optical assembly is rotated accordingly to adjust projection direction of the projector.

10. The projector of claim 3, wherein the main body comprises a front portion, the lens is installed in the front portion, the recess is defined in the front portion.

11. A projector, comprising:
    a main body for forming an image and projecting the image via a lens along a first direction;
    an optical assembly operable to be detachable from a light path of the lens, the optical assembly configured for reflecting the light beams from the lens to project an image along a second direction, the first direction intersecting with the second direction; and
    a moveable member rotatably connecting to the main body, the optical assembly being set on the connecting part; the moveable member defining an opening, the opening running through the moveable member and being along the optical axis, the optical assembly receiving the light beams from the lens after passing through the opening.

12. The projector of claim 11, wherein the first direction is substantially perpendicular with an optical axis of the lens; the second direction is substantially parallel to the optical axis of the lens.

13. The projector of claim 11, wherein one end of the moveable member is moveable received in the main body, the other end of the moveable member extends out of the main body to form a connecting part, the optical assembly is set on the connecting part.

14. The projector of claim 13, wherein the main body defines a recess, the received end of the moveable member is received in the recess, length of the connecting part is operable to be adjusted by changing depth of the received end in the recess.

15. The projector of claim 14, wherein the received end of the moveable member is detachable received in the recess.

16. The projector of claim 14, wherein the optical assembly comprises an optical member and a carrier for carrying the optical member, the carrier is rotatably connected to the connecting part, the optical member is configured for reflecting the light beams to project an image on the second screen.

17. The projector of claim 16, wherein the optical member is a mirror.

18. A projector, comprising:
    a main body for forming an image and projecting the image via a lens along a first direction;
    an optical assembly operable to be detachable from a light path of the lens, the optical assembly configured for reflecting the light beams from the lens to project an image along a second direction, the first direction intersecting with the second direction; and
    a moveable member detachably connecting to main body, the optical assembly connected to the moveable member, the moveable member being detachably from the main body to enable the optical assembly to be detachable from the light path of the lens.

19. The projector of claim 18, wherein one end of the moveable member is moveable received in the main body, the other end of the moveable member extends out of the main body to form a connecting part, the optical assembly is set on the connecting part.

20. The projector of claim 18, wherein the moveable member defines an opening, the opening runs through the moveable member and is along the optical axis, the optical assembly receives the light beams from the lens after passing through the opening.

* * * * *